(12) United States Patent
Liu et al.

(10) Patent No.: US 7,432,688 B2
(45) Date of Patent: Oct. 7, 2008

(54) SOFT-TRANSITION CONTROLLER OF A SYNCHRONOUS CONVERTER

(75) Inventors: Zhizheng Liu, Shanghai (CN); Lam D. Vu, Plano, TX (US)

(73) Assignee: Lineage Power Corporation, Mesquite, TX (US)

( * ) Notice: Subject to any disclaimer, the term of this patent is extended or adjusted under 35 U.S.C. 154(b) by 208 days.

(21) Appl. No.: 11/356,701

(22) Filed: Feb. 17, 2006

(65) Prior Publication Data
US 2007/0115703 A1    May 24, 2007

(51) Int. Cl.
*G05F 1/613* (2006.01)

(52) U.S. Cl. ........................... 323/224; 323/282

(58) Field of Classification Search ............... 323/282, 323/283, 224, 284, 901, 908; 363/41, 49, 363/50
See application file for complete search history.

(56) References Cited

U.S. PATENT DOCUMENTS

| | | | | |
|---|---|---|---|---|
| 4,520,437 | A * | 5/1985 | Boettcher et al. | 363/41 |
| 6,760,235 | B2 * | 7/2004 | Lin et al. | 363/21.06 |
| 2004/0189269 | A1 * | 9/2004 | Lynch | 323/282 |

* cited by examiner

*Primary Examiner*—Shawn Riley

(57) ABSTRACT

The present invention provides a soft-transition controller for use with a synchronous converter having primary and secondary rectifiers. In one embodiment, the soft-transition controller includes a primary driver configured to provide a primary drive signal to the primary rectifier operating in a synchronous mode, while the secondary rectifier is operating in a diode mode, to provide an output voltage of the synchronous rectifier. Additionally, the soft-transition controller also includes a complementary driver coupled to the primary driver and configured to provide a soft-transition drive signal during a transition period, which transfers the secondary rectifier from the diode mode to a synchronous mode while maintaining the output voltage within a predetermined voltage range.

24 Claims, 5 Drawing Sheets

SOFT-TRANSITION CONTROLLER OF A SYNCHRONOUS CONVERTER

CROSS-REFERENCE TO RELATED APPLICATION

This Application claims the benefit of Chinese Patent Application No. 2005-10126731.1 filed on Nov. 21, 2005, entitled "A SOFT-TRANSISTION CONTROLLER, METHOD OF CONTROLLING A SOFT TRANSITION AND A SYNCHRONOUS CONVERTER EMPLOYING THE SAME," commonly assigned with the present invention and incorporated herein by reference.

TECHNICAL FIELD OF THE INVENTION

The present invention is directed, in general, to power conversion and, more specifically, to a soft-transition controller, a method of controlling a soft transition and a synchronous converter employing the controller or the method.

BACKGROUND OF THE INVENTION

Power converters are broadly used in the computer and telecommunications industries to provide local power in a large number of applications. Synchronous rectification, using primary and secondary controllable switches, is widely used to improve the efficiency of a converter over one employing diode rectification. Diode rectifiers provide a conducting or forward voltage drop of about 700 millivolts as may be compared to synchronous rectifiers that provide a conducting voltage drop of only about 50 millivolts. Therefore, the rectifier power loss employing synchronous rectification is about an order of magnitude less than diode rectification. However, diode rectification may be used during a start-up mode of the synchronous converter.

One example of using diode rectification in the start-up mode occurs when the synchronous converter is used in parallel with another operating voltage source that provides a preexisting or pre-bias voltage on the output of the synchronous converter. This pre-bias voltage condition would cause the synchronous converter, employing synchronous rectification, to both source and sink load current during start-up until its output voltage reached the pre-bias voltage level. This sinking of load current is both highly undesirable and unacceptable by end users of the power converter, since it causes unpredictable or unacceptable current loads on the operating parallel voltage source thereby subjecting it to overload or failure. To solve the pre-bias voltage issue, the secondary controllable switch has to be disabled at the first stage of start-up, and secondary diode rectification used instead.

Another problem is typically encountered when converter operation transfers to the synchronous rectification mode. If the secondary rectifier suddenly transfers from the diode mode to the synchronous rectifier mode, this hard transition results in an output voltage spike having a polarity that is dependent upon converter load current. An overshoot may occur with high loads and an undershoot may occur with light loads. Both of these effects prevent a desired monotonic rise in output voltage and may also create an undesirable reverse current issue. Each of these effects results in a deleterious effect on the end system.

Accordingly, what is needed in the art is a way to transition from a diode rectification mode to a synchronous rectification mode without substantially affecting the output voltage.

SUMMARY OF THE INVENTION

To address the above-discussed deficiencies of the prior art, the present invention provides a soft-transition controller for use with a synchronous converter having primary and secondary rectifiers. In one embodiment, the soft-transition controller includes a primary driver configured to provide a primary drive signal to the primary rectifier operating in a synchronous mode, while the secondary rectifier is operating in a diode mode, to provide an output voltage of the synchronous rectifier. Additionally, the soft-transition controller also includes a complementary driver coupled to the primary driver and configured to provide a soft-transition drive signal during a transition period, which transfers the secondary rectifier from the diode mode to a synchronous mode while maintaining the output voltage within a predetermined voltage range.

In another aspect, the present invention provides a method of controlling a soft transition for use with a synchronous converter having primary and secondary rectifiers. The method includes providing a primary drive signal to the primary rectifier operating in a synchronous mode, while the secondary rectifier is operating in a diode mode, to provide an output voltage of the synchronous converter. The method also includes further providing a soft-transition drive signal during a transition period thereby transferring the secondary rectifier from the diode mode to a synchronous mode while maintaining the output voltage within a predetermined voltage range.

The present invention also provides, in yet another aspect, a synchronous converter. The synchronous converter includes primary and secondary rectifiers coupled to an output inductor and capacitor as well as a soft-transition controller coupled to the primary and secondary rectifiers. The soft-transition controller has a primary driver that provides a primary drive signal to the primary rectifier, which is operating in a synchronous mode while the secondary rectifier is operating in a diode mode, to provide an output voltage of the synchronous rectifier. The soft-transition controller also has a complementary driver, coupled to the primary driver, that provides a soft-transition drive signal during a transition period to transfer the secondary rectifier from the diode mode to a synchronous mode while maintaining the output voltage within a predetermined voltage range.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
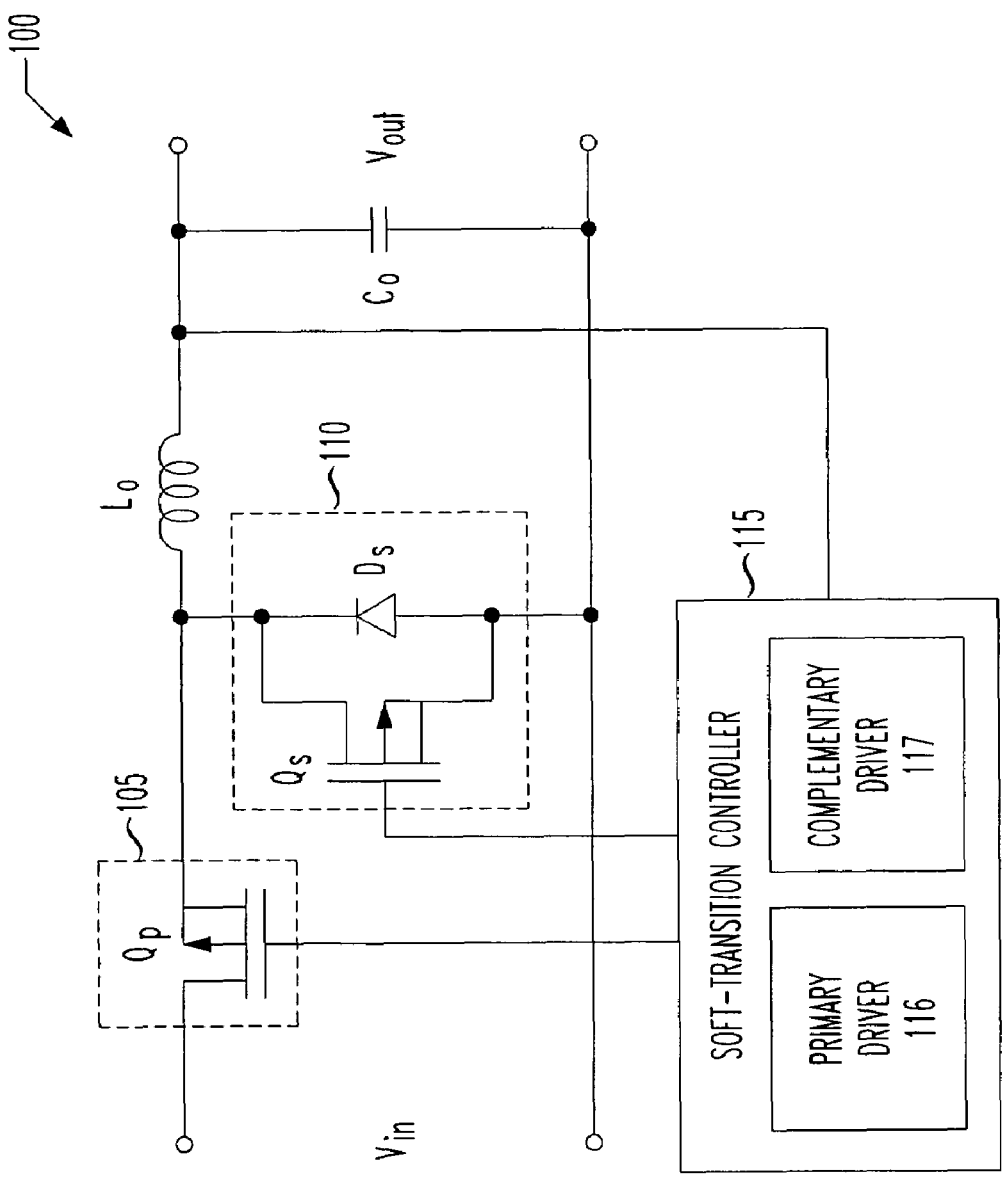
FIG. 1 illustrates a schematic diagram of an embodiment of a synchronous converter constructed in accordance with the principles of the present invention.

Referring initially to FIG. 1, illustrated is a schematic diagram of an embodiment of a synchronous converter, generally designated 100, constructed in accordance with the principles of the present invention. The synchronous converter 100 is connected to an input voltage $V_{in}$ and includes a primary rectifier 105 having a primary controllable switch $Q_p$, a secondary rectifier 110 having a secondary controllable switch $Q_s$ parallel coupled to a secondary rectifier diode $D_s$, an output inductor Lo, an output capacitor Co and a soft-transition controller 115 having a primary driver 116 and a complementary driver 117. The synchronous converter 100 provides an output voltage $V_o$.

During a normal or fully synchronous mode of operation, the soft-transition controller 115 provides conventional pulse width modulation (PWM) signals to the synchronous converter 100. The primary driver 116 provides a primary conduction period d to the primary rectifier 105, and the complementary driver 117 provides a secondary conduction period (1-d) to the secondary rectifier 110. The primary conduction period d and the secondary conduction period (1-d) are contiguous an alternate to form a complete control cycle. The soft-transition controller 115 monitors the output voltage $V_o$ and adjusts the primary pulse duration d to provide regulation of the output voltage $V_o$ as a load current of the synchronous converter 100 varies. During the primary conduction period d, the output of the synchronous converter 100 is coupled to the input voltage $V_{in}$ and during the secondary conduction period (1-d), the output voltage is freewheeling.

During a start-up mode of operation, the secondary rectifier 110 operates in a diode mode wherein the secondary rectifier diode $D_s$ is initially employed and the secondary controllable switch $Q_s$ is not used. This accommodates any pre-bias voltage issues and prevents current sinking from a parallel-connected output voltage source. The primary driver 116 provides the primary conduction period d to the primary rectifier 105, as before. However, the complementary driver 117 maintains the secondary controllable switch $Q_s$ in a non-conducting mode and the secondary rectifier diode $D_s$ is employed in providing an initial build-up of the output voltage $V_o$ of the synchronous converter 100 while also accommodating its freewheeling operation.

At an appropriate time during start-up of the synchronous converter 100, a transition period is initiated wherein the complementary driver 117, which is still coupled to the primary driver 116, provides a soft-transition drive signal to the secondary controllable switch $Q_s$ to transition the secondary rectifier 110 from the diode mode to a synchronous mode. The soft-transition drive signal maintains the output voltage $V_o$ within a predetermined voltage range during the transition period. The predetermined voltage range provides an output voltage deviation from a continued diode mode operation of the secondary rectifier 110, during the transition period, that may be defined by an allowable change per transition step.

Figure 2A:
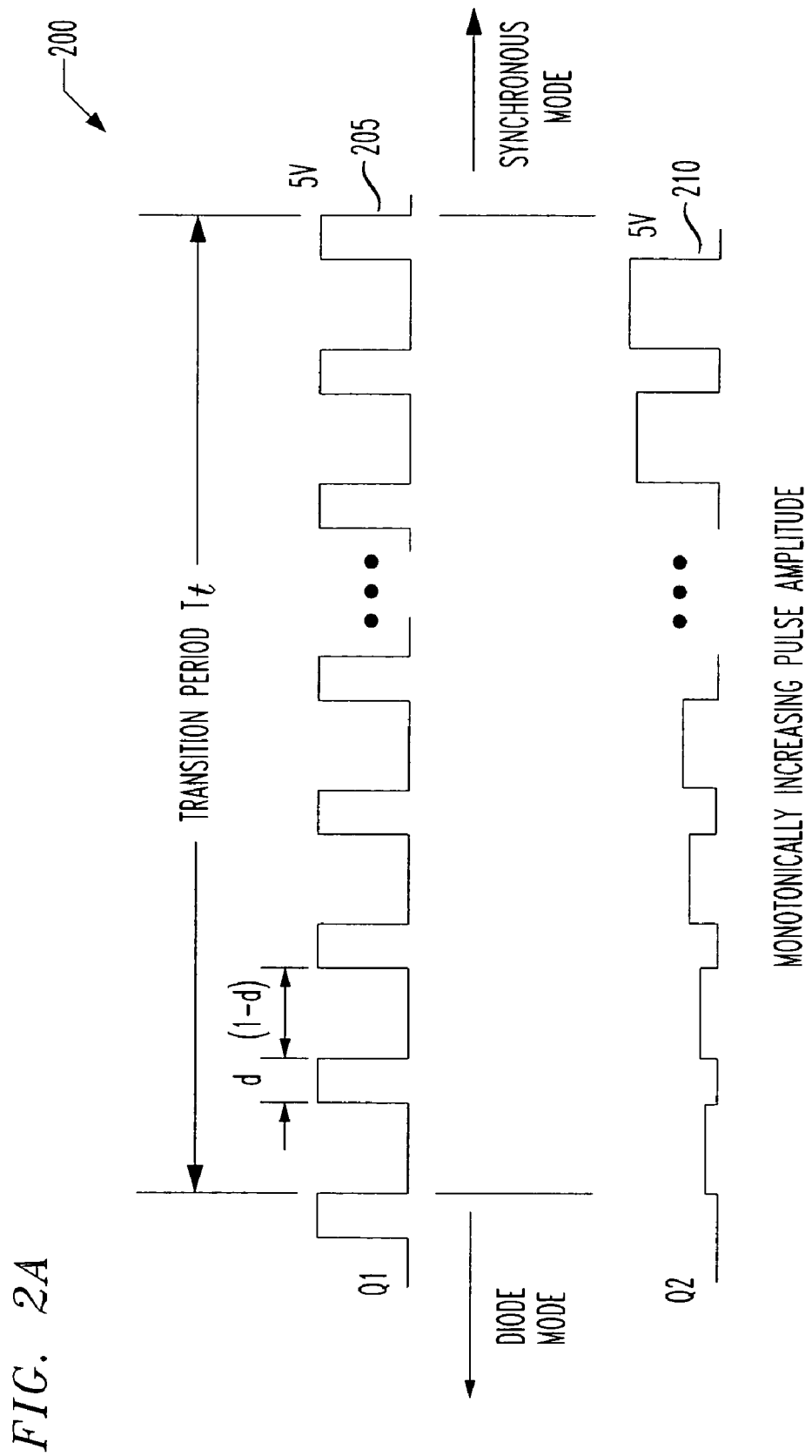
FIG. 2A illustrates an embodiment of drive signals as may be provided by a soft-transition controller and constructed in accordance with the principles of the present invention.

Turning momentarily to FIG. 2A, illustrated is an embodiment of drive signals, generally designated 200, as may be provided by a soft-transition controller and constructed in accordance with the principles of the present invention. The drive signals 200 include a primary drive signal 205 and a soft-transition drive signal 210. In the illustrated embodiment, the primary drive signal 205 provides a pulse having a constant pulse amplitude of five volts wherein each pulse employs a primary conduction period d, as shown.

Prior to a transition period $T_t$, the soft-transition drive signal 210 is maintained inactive at zero volts, and following the transition period $T_t$, the soft-transition drive signal 210 provides a five volt pulse having a secondary conduction period (1-d). During the transition period $T_t$, the soft-transition drive signal 210 provides a plurality of transition steps having monotonically increasing pulse amplitudes during each consecutive secondary conduction period (1-d). Each of these monotonically increasing pulse amplitudes provides a greater degree of conduction of a secondary controllable switch thereby allowing a predictable and orderly transition to full synchronous operation. The number of transition steps and the corresponding incremental transition amplitudes of each step employed during the transition period $T_t$ may be defined to control an output voltage deviation.

Figure 2B:
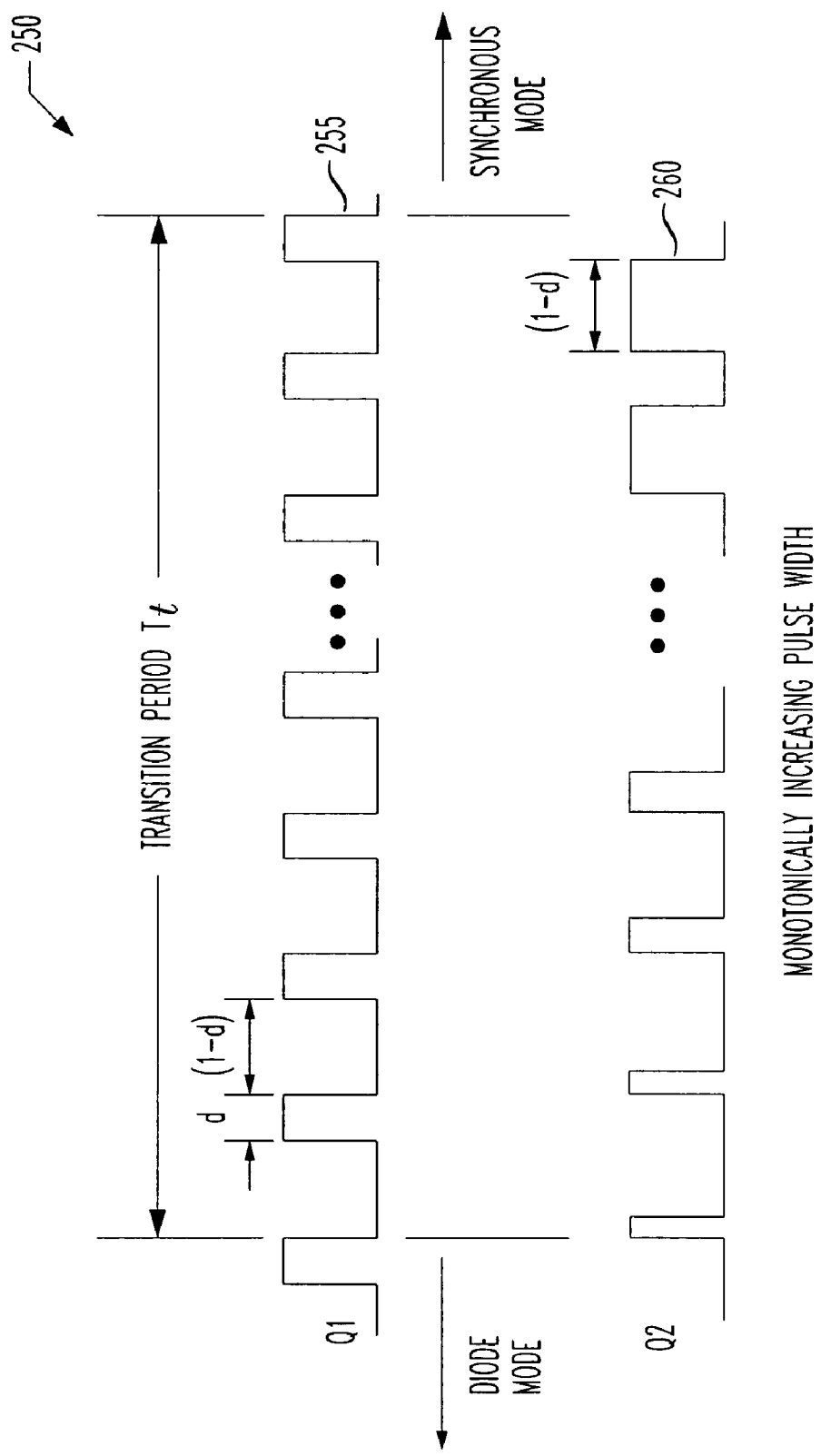
FIG. 2B illustrates an alternative embodiment of drive signals as may be provided by a soft-transition controller and constructed in accordance with the principles of the present invention.

Turning momentarily to FIG. 2B, illustrated is an alternative embodiment of drive signals, generally designated 250, as may be provided by a soft-transition controller and constructed in accordance with the principles of the present invention. The drive signals 250 include a primary drive signal 255 and a soft-transition drive signal 260. In the illustrated alternative embodiment, the primary drive signal 255 provides a pulse having a constant pulse amplitude of five volts wherein each pulse employs a primary conduction period d, as before.

Prior to a transition period $T_t$, the soft-transition drive signal 260 is maintained inactive at zero volts, and following the transition period $T_t$, the soft-transition drive signal 260 provides a five volt pulse having a secondary conduction period (1-d), as previously discussed. During the transition period $T_t$, the soft-transition drive signal 260 provides a plurality of transition steps having monotonically increasing pulse widths that start smaller than the secondary conduction period (1-d) and increase during each consecutive secondary rectifier period until they reach the secondary conduction period (1-d). Each of these monotonically increasing pulse widths provides a greater conduction time of a secondary controllable switch thereby allowing a predictable and orderly transition to full synchronous operation. Again, the number of transition steps and the corresponding incremental transition width of each step employed during the transition period $T_t$ may be defined to control an output voltage deviation.

Although the illustrated embodiments of FIGS. 2A, 2B employ substantially linear transition amplitudes, the respective soft-transition drive signals 210, 260 may assume other transition step profiles as dictated by a given transition requirement for output voltage deviation. Additionally, one skilled in the pertinent art will understand that a transition step profile may be employed wherein a monotonically changing pulse amplitude may be combined with monotonically increasing pulse width, as well. They also may be tailored to accommodate various drive requirements or characteristics, afforded by the secondary controllable switch and the secondary rectifier diode, needed to produce a required output voltage waveform characteristic. Of course, the primary conduction period d, and correspondingly the secondary conduction period (1-d), may vary during the transition period $T_t$.

Returning now to FIG. 1, the soft transition drive signal, such as discussed with respect to FIG. 2A or 2B, intermittently connects the secondary controllable switch $Q_s$ in parallel with the secondary rectifier diode $D_s$. Each of these intermittent connections employs a monotonically increasing amount of parallel connection during the transition period. Increases in this amount of parallel connection may be linear or nonlinear as dictated by a particular output voltage characteristic and specific components employed in the secondary rectifier.

These monotonically increasing connection times provide a piece-wise linear transition in the resistance and voltage drop of the secondary rectifier from a full diode rectification mode to a full synchronous rectification mode. An orderly transformation to full synchronous operation of the synchronous converter 100 is thereby provided by this piece-wise linear transition. The soft-transition drive signal may appropriately accommodate all output current conditions of the synchronous converter 100 up to its rated load current. Additionally, the soft-transition drive signal may be provided when the output voltage $V_o$ exceeds a predetermined level or when the output voltage $V_o$ has reached a rated load voltage.

Figure 3:
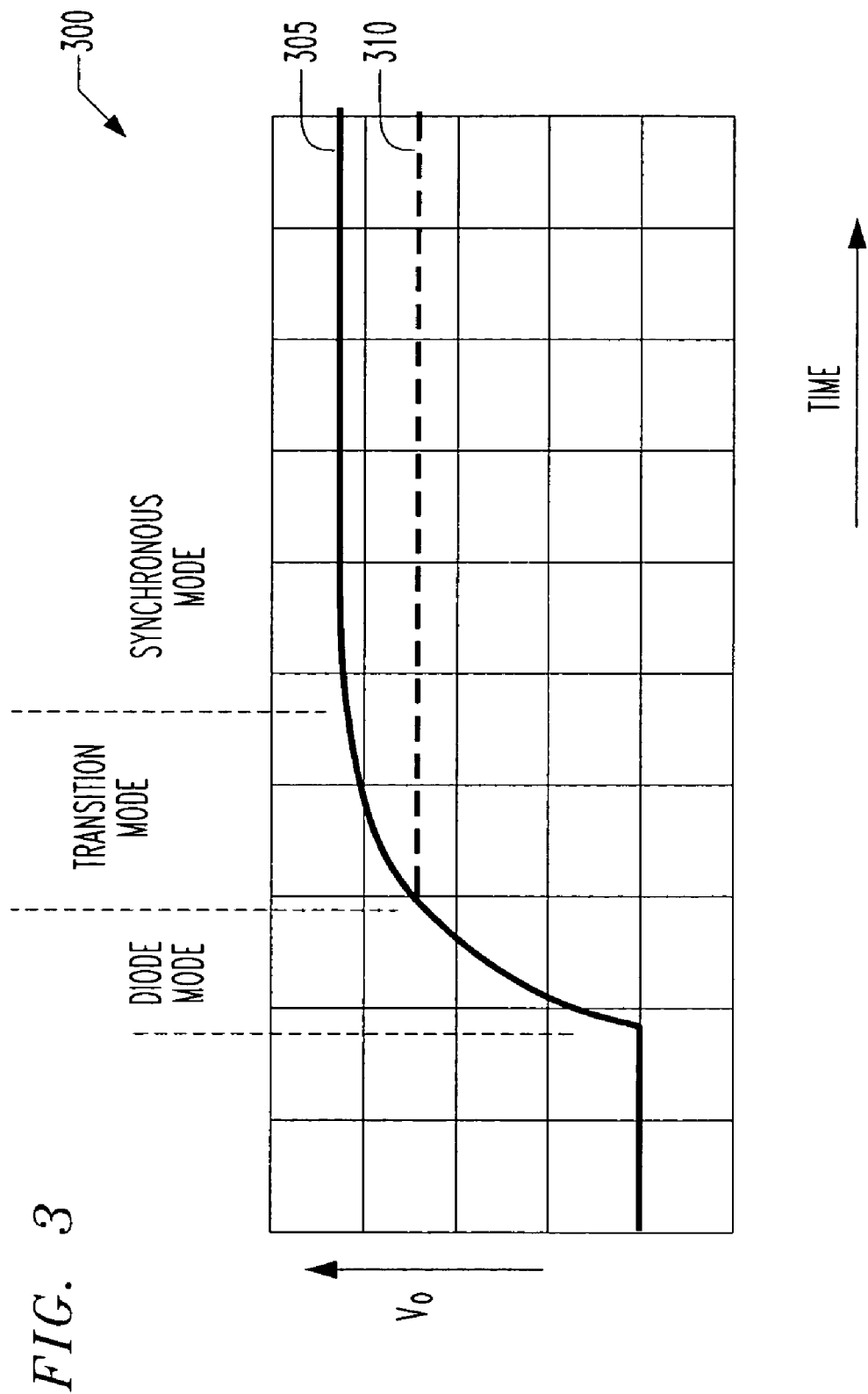
FIG. 3 illustrates an example of voltage waveforms associated with a synchronous converter such as that discussed with respect to FIG. 1.

Turning now to FIG. 3, illustrated is an example of voltage waveforms, generally designated 300, associated with a synchronous converter such as that discussed with respect to FIG. 1. The voltage waveforms 300 include an output voltage waveform 305 and a predetermined level 310. The output voltage waveform 305 corresponds to three operating modes of the synchronous converter that occur during its start-up operation. The synchronous converter starts with a secondary rectifier in a diode mode. Then, the secondary rectifier is operated in a transition mode wherein it transfers from the diode mode to a synchronous mode in an orderly and substantially monotonic fashion when the output voltage has reached the predetermined level 310.

Figure 4:
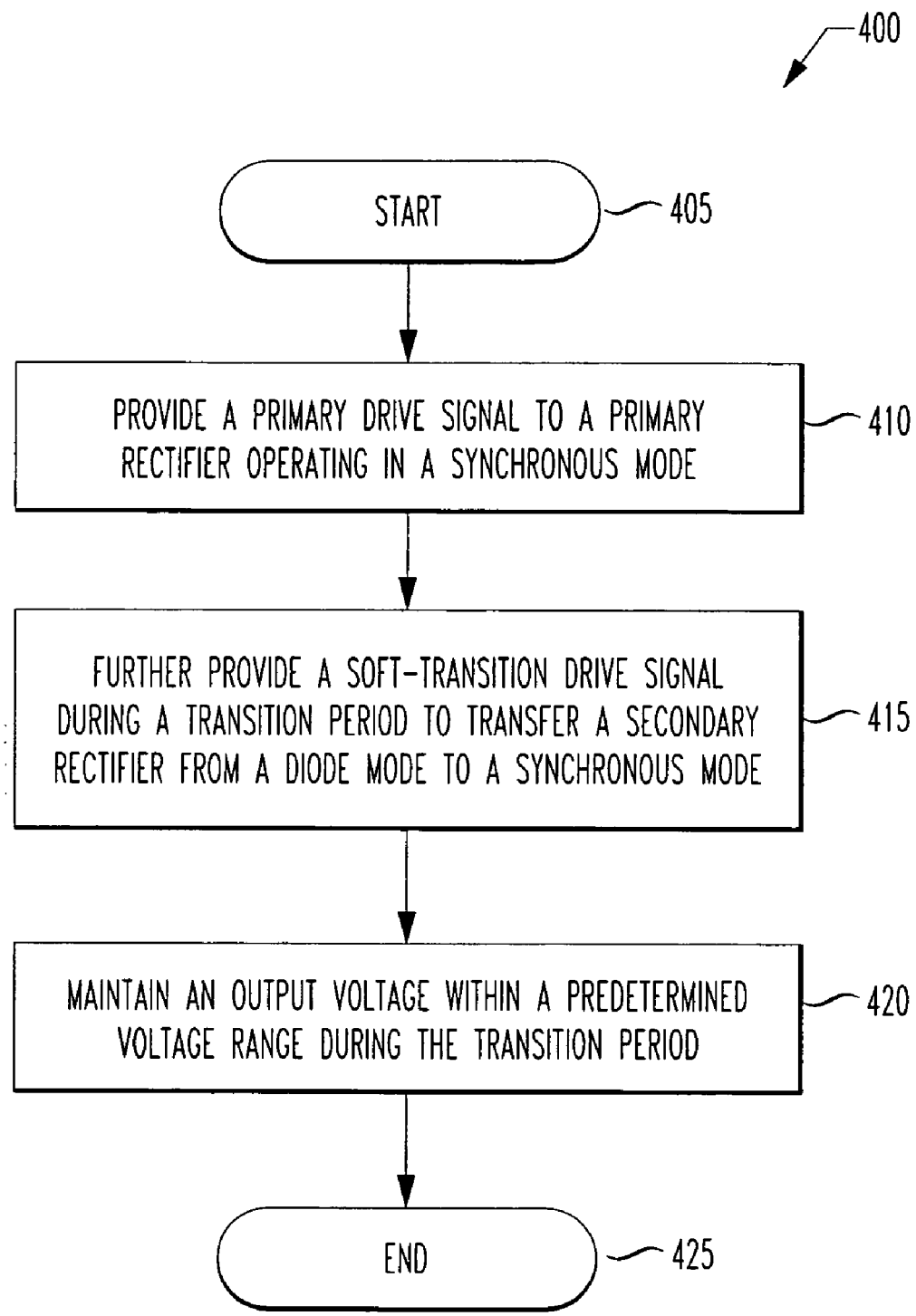
FIG. 4 illustrates a flow diagram of a method of controlling a soft transition carried out in accordance with the principles of the present invention.

Turning now to FIG. 4, illustrated is a flow diagram of a method of controlling a soft transition, generally designated 400, carried out in accordance with the principles of the present invention. The method 400 is for use with a synchronous converter having primary and secondary rectifiers and starts in a step 405. Then, a primary drive signal is provided to the primary rectifier operating in a synchronous mode, while the secondary rectifier is operating in a diode mode, in a step 410. The step 410 thereby provides an output voltage of the synchronous converter, while it is typically performing in a start-up mode of operation.

The secondary rectifier includes a diode parallel coupled to a controllable switch such that it may operate in either the diode mode or a synchronous mode employing the controllable switch. A soft-transition drive signal is further provided during a transition period thereby transferring the secondary rectifier from the diode mode to the synchronous mode, in a step 415. Additionally, the soft-transition drive signal is provided to accommodate all output current conditions of the synchronous converter up to a rated load current.

In the illustrated embodiment, the soft-transition drive signal is employed to transition between the start-up mode and a normal mode of operation of the synchronous converter. Additionally, the soft-transition drive signal may be employed when a pre-bias voltage exists on the output of the synchronous converter to prevent current sinking by the synchronous converter from a pre-bias voltage source. The transition period occurs for this case when the output voltage equals or exceeds the pre-bias voltage. Alternatively, the soft-transition drive signal may be provided during a transition period when the output voltage has reached a rated load voltage during either an existing pre-bias voltage source condition or when a pre-bias voltage is not present.

The output voltage of the synchronous converter is maintained within a predetermined voltage range during the transition period, in a step 420. The predetermined voltage range provides an output voltage deviation from a continued diode mode operation of the secondary rectifier that is defined by an allowable change per transition step of the secondary rectifier. In one embodiment of the present invention, the soft-transition drive signal provides a monotonically changing pulse amplitude during the transition period. In an alternative embodiment, the soft-transition drive signal provides a monotonically increasing pulse width during the transition period. In each of these embodiments, the amount of monotonic change per transition step and the number of transition steps per transition period are selectable. Varying this amount of change and number of steps allows the output voltage deviation to be tailored to meet a given requirement. The method 400 ends in a step 425.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps is not a limitation of the present invention.

In summary, embodiments of the present invention employing a soft-transition controller, a method of controlling a soft transition and a synchronous converter employing the controller or the method have been presented. Advantages include the capability of a synchronous converter to transition from a start-up condition employing a diode mode of rectification to a synchronous mode of operation while maintaining its output voltage within a predetermined voltage range. This predetermined voltage may approximate continued operation in the diode mode as closely as required depending upon the relationship between the length of the transition period and the amount of change afforded by each step of the soft-transition drive signal. This change may be accomplished by an incremental monotonic change in the pulse amplitude or the pulse width of the soft-transition drive signal.

Although the present invention has been described in detail, those skilled in the art should understand that they can make various changes, substitutions and alterations herein without departing from the spirit and scope of the invention in its broadest form.

What is claimed is:

1. A soft-transition controller for use with a synchronous converter having primary and secondary rectifiers, an output inductor and an output capacitor, comprising:
   a primary driver configured to provide a primary drive signal to said primary rectifier operating in a synchronous mode, while said secondary rectifier is operating in a diode mode, to provide an output voltage of said synchronous converter; and
   a complementary driver configured to provide a soft-transition drive signal during a transition period to transfer said secondary rectifier from said diode mode to a synchronous mode while maintaining said output voltage within a predetermined voltage range based on a voltage measured at a node between said output inductor and said output capacitor.

2. The controller as recited in claim 1 wherein said soft-transition drive signal provides a monotonically changing pulse amplitude during said transition period.

3. The controller as recited in claim 1 wherein said soft-transition drive signal provides a monotonically increasing pulse width during said transition period.

4. The controller as recited in claim 1 wherein said soft-transition drive signal is provided when said output voltage has reached a predetermined level.

5. The controller as recited in claim 1 wherein said soft-transition drive signal is provided for all output current conditions of said synchronous converter up to a rated load current.

6. The controller as recited in claim 1 wherein said soft-transition drive signal is employed to transition between a start-up mode and a normal mode of operation of said synchronous converter.

7. The controller as recited in claim 1 wherein said predetermined voltage range provides an output voltage deviation from a continued diode mode operation of said secondary rectifier during said transition period that is defined by an allowable change per transition step.

8. The controller as recited in claim 1 wherein said secondary rectifier includes a diode parallel coupled to a controllable switch.

9. A method of controlling a soft transition for use with a synchronous converter having primary and secondary rectifier, an output inductor and an output capacitor, comprising:

providing a primary drive signal to said primary rectifier operating in a synchronous mode, while said secondary rectifier is operating in a diode mode, to provide an output voltage of said synchronous converter; and further providing a soft-transition drive signal during a transition period thereby transferring said secondary rectifier from said diode mode to a synchronous mode while maintaining said output voltage within a predetermined voltage range based on a voltage measured at a node between said output inductor and said output capacitor.

10. The method as recited in claim 9 wherein said soft-transition drive signal provides a monotonically changing pulse amplitude during said transition period.

11. The method as recited in claim 9 wherein said soft-transition drive signal provides a monotonically increasing pulse width during said transition period.

12. The method as recited in claim 9 wherein said soft-transition drive signal is provided when said output voltage has reached a predetermined level.

13. The method as recited in claim 9 wherein said soft-transition drive signal is provided for all output current conditions of said synchronous converter up to a rated load current.

14. The method as recited in claim 9 wherein said soft-transition drive signal is employed to transition between a start-up mode and a normal mode of operation of said synchronous converter.

15. The method as recited in claim 9 wherein said predetermined voltage range provides an output voltage deviation from a continued diode mode operation of said secondary rectifier during said transition period that is defined by an allowable change per transition step.

16. The method as recited in claim 9 wherein said secondary rectifier includes a diode parallel coupled to a controllable switch.

17. A synchronous converter, comprising:

primary and secondary rectifiers coupled to an output inductor and an output capacitor, and a soft-transition controller coupled to said primary and secondary rectifiers, including:

a primary driver that provides a primary drive signal to said primary rectifier operating in a synchronous mode, while said secondary rectifier is operating in a diode mode, to provide an output voltage of said synchronous converter, and a complementary driver that provides a soft-transition drive signal during a transition period to transfer said secondary rectifier from said diode mode to a synchronous mode while maintaining said output voltage within a predetermined voltage range based on a voltage measured between said output inductor and said output capacitor.

18. The converter as recited in claim 17 wherein said soft-transition drive signal provides a monotonically changing pulse amplitude during said transition period.

19. The converter as recited in claim 17 wherein said soft-transition drive signal provides a monotonically increasing pulse width during said transition period.

20. The converter as recited in claim 17 wherein said soft-transition drive signal is provided when said output voltage has reached a predetermined level.

21. The converter as recited in claim 17 wherein said soft-transition drive signal is provided for all output current conditions of said synchronous converter up to a rated load current.

22. The converter as recited in claim 17 wherein said soft-transition drive signal is employed to transition between a start-up mode and a normal mode of operation of said synchronous converter.

23. The converter as recited in claim 17 wherein said predetermined voltage range provides an output voltage deviation from a continued diode mode operation of said secondary rectifier during said transition period that is defined by an allowable change per transition step.

24. The converter as recited in claim 17 wherein said secondary rectifier includes a diode parallel coupled to a controllable switch.

* * * * *